United States Patent [19]
Benhase

[11] Patent Number: 4,531,867
[45] Date of Patent: Jul. 30, 1985

[54] CUTTING TOOL

[75] Inventor: Craig Benhase, Loveland, Ohio

[73] Assignee: Dexport Tool Company, Cincinnati, Ohio

[21] Appl. No.: 580,622

[22] Filed: Feb. 16, 1984

[51] Int. Cl.³ .............................................. B23B 51/08
[52] U.S. Cl. .................................... 408/224; 408/713
[58] Field of Search ............... 408/713, 223, 224, 227, 408/229

[56] References Cited
U.S. PATENT DOCUMENTS
4,265,574  5/1981  Eckle .............................. 408/713 X FOREIGN PATENT DOCUMENTS
135576  5/1979  Fed. Rep. of Germany ...... 408/713
144907  11/1980  Japan ................................... 408/713

Primary Examiner—Eugene F. Desmond
Attorney, Agent, or Firm—Edward J. Utz

[57] ABSTRACT

A cutting tool having an upper cylindrical body and a lower cylindrical body with flat surfaces on opposite sides of the lower cylindrical body, a pair of flutes in said lower cylindrical body and one cutting element indexible to three separate positions and another cutting element carried within said flute and means for detachably securing said cutting elements, and a cutting element in the opposite flute having three cutting edges.

7 Claims, 17 Drawing Figures

CUTTING TOOL

This invention relates to a cutting tool and in particular relates to tools used to enlarge the diameter of holes. In enlarging the diameter of an already formed deep hole, it is frequently advantageous to use a cutting tool provided with a replaceable cutting element. It is important that the cutting element be sufficiently and properly mounted to prevent movement of the cutting element during operation. It is also frequently desirable to enlarge an already formed hole, to counterbore the hole, and to face the counterbored hole by utilizing cutting tools mounted on a longitudinal rod. One of the problems which arises from the use of such a tool having multiple cutting elements is the removal of a chipped material, achieving proper hole sizes and seal surfaces finishes chatter free.

It is the principal object of this invention therefore, to provide a cutting tool consisting of a cylindrical rod or bar being provided with multiple cutting elements, the first cutting element resting on one diameter, the second cutting element on a second and larger diameter portion of the bar and a third cutting element affixed to a third and larger diameter portion of the bar.

Another object of my invention is to provide a tool having replaceable cutting elements so constructed that movement of the cutting element relative to the tool bar during cutting is such that chips removed by the cutting element may pass freely away from the cutting element.

Still another object of my invention is to provide a cutting element so constructed that it may be secured to the tool bar and provide for selected multiple cutting edges.

The particular cutting tool which I utilize is designed to first ream the driven hole, and in some instances, produce its own hole from solid material, second countersink the hole and third spot face the hole after it has been reamed and countersunk. The cutting element used for reaming the hole is provided with a clearance angle of 11 degrees and has cutting edges and is indexible to multiple cutting positions. The contouring tool is provided with multiple cutting edges and may be automatically positioned. The countersinking portion of the tool and the countersinking cutter is provided with primary and secondary clearance angles. The third cutter is similar to the cutter used for boring and is positioned on the shaft so that it spot faces the hole. Two of these cutting elements are indexible.

It is, therefore, an additional object of my invention to provide indexible cutters mounted on a boring bar so that the indexible cutters may be positioned successively to lessen the necessity of replacement.

Another object of my invention is to provide a cutting tool or boring bar which has cutters which are indexible to multiple cutting positions. The cutting element is so designed in relation to the boring bar that it may be reoriented after each cutter is worn and this is accomplished by loosening a set screw, rotating the cutter and tightening the setscrew.

Another object of my invention is to mount the cutters so that the cutting point in each member, whether reaming, countersinking or facing, projects only about ½ millimeter or less beyond the circular cross-section of the portion of the boring bar to which it is indexibly secured.

Still another object of my invention is to provide a cutter bar with indexible readily replaceable inserts which substantially reduce down time and replacement costs.

Other objects and details of construction and economies of operation will be readily apparent from the detailed description to follow of the cutters and of the mounting for the cutters on the boring bar.

The objects and advantages of this invention will be apparent from the detailed description to follow and from a reference to the accompanying drawings in which the several views are taken looking in the direction of the arrows at the end of the section lines.

Figure 1:
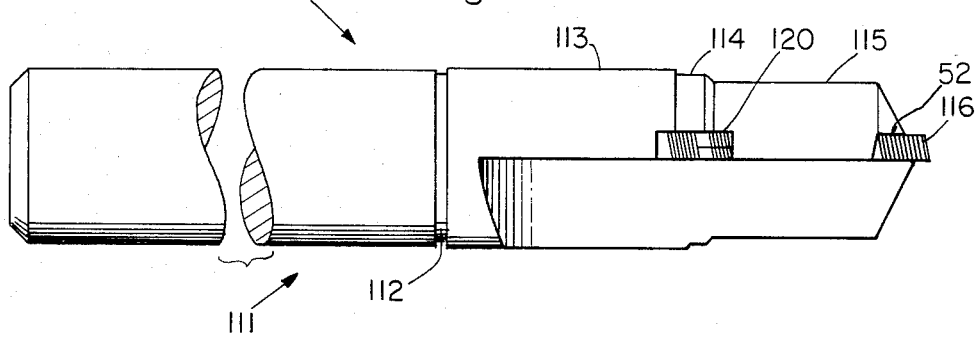
FIG. 1 is a side elevation view of an insert type cutting tool embodying the invention.

Referring in particular to the drawings, I show in FIG. 1 a bar indicated generally at 110 which has a shank area 111, a groove 112 and a large diameter portion 113, a small diameter portion 114 and a still smaller diameter portion 115. The cutting tool at its lower diameter 115 is provided with a triangular indexible carbide cutting element 116, secured in position by means of a setscrew 117. (FIG. 2)

This insert 116 is triangular in shape, the triangle being formed around an internal diameter of two hundred thousandths to three hundred seventy five thousandths and other variables including ¼ to ½ inches. The triangular cutter in its preferred embodiment is ⅛ inch thick and tapers from its upper edge to its lower edge to provide an eleven (11) degree clearance angle. An appropriately sized opening is provided for the setscrew 117. A flute 118 is cut in the bar diameters 113, 114 and 115 so that the cutting element 116 may be indexibly secured to the bar 110 as shown in FIG. 2.

Figure 3:
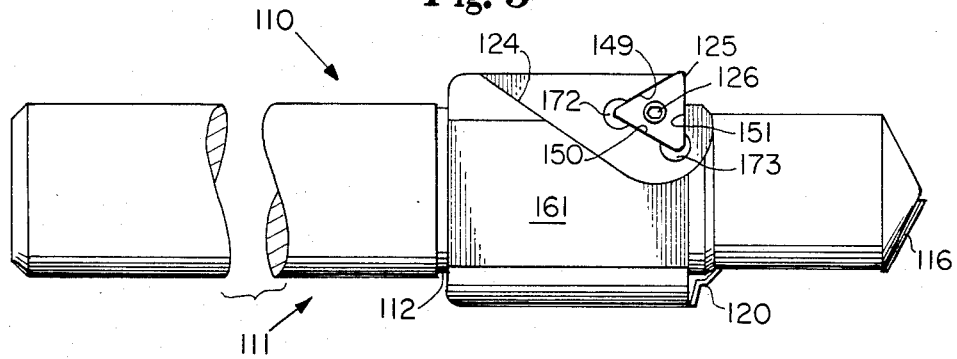
FIG. 3 is a side elevation view of the boring tool embodying the invention taken at an angle 180 degrees from that shown in FIG. 1.

Similarly, within this flute 118, a second cutting element 120 is provided for contouring and is replaceable within the flute 118 and secured by a setscrew 121. An additional flute 124 is provided in the bar 110 as shown in FIG. 3 to receive a cutting element 125 secured by a setscrew 126. This flute with its cutting element 125 provides for facing operations. The same or similar type of cutting element used for reaming and shown in FIG.

Figure 2:
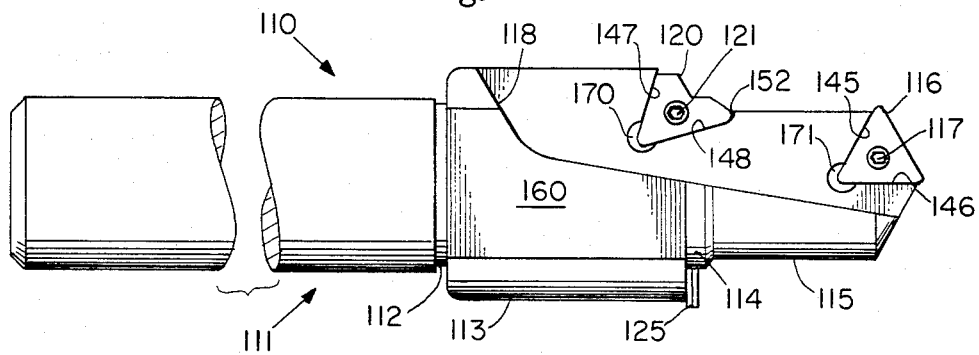
FIG. 2 is a top view of the tool shown in FIG. 1.
Figure 4:
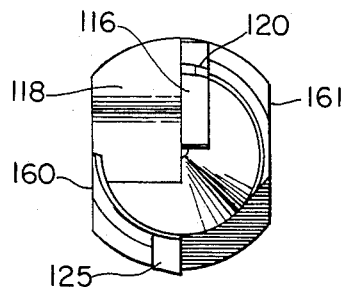
FIG. 4 is an end view of the tool shown in FIGS. 1, 2, and 3.

1 and FIG. 4 as 116 may be utilized for facing due to its position in the flute 124 and shown in FIG. 2.

Figure 5:
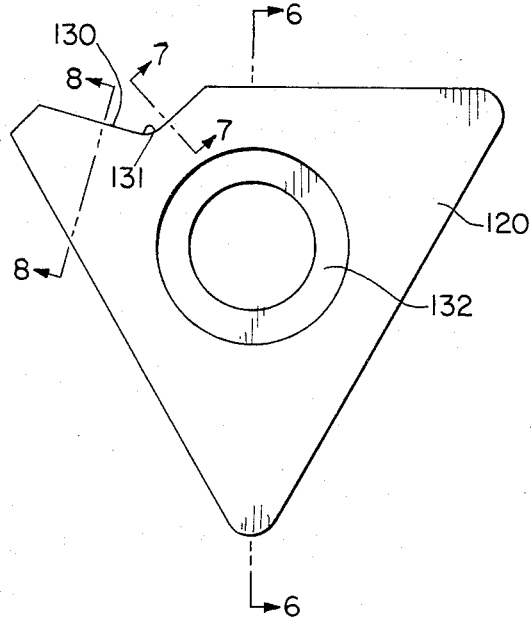
FIG. 5 is a plan view of one cutting element.
Figure 7:
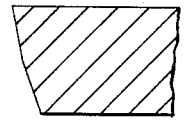
FIG. 7 is a sectional view taken along the line 7—7 of FIG. 5.
Figure 6:
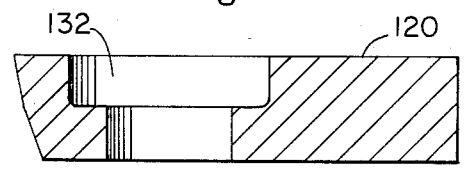
FIG. 6 is a sectional view taken along the line 6—6 of FIG. 5.
Figure 8:
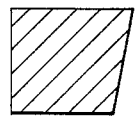
FIG. 8 is a sectional view taken along the line 8—8 of FIG. 5.

Referring in particular to the cutting element 120 illustrated in FIGS. 5, 6, 7 and 8, I show a carbide cutting element for example having an internal circumference of ¼ or ⅜ inches and a thickness of 0.125 inches. As shown in FIG. 5, the entire cutting edge has an angle of 45 degrees from the center line of the tool and is cut back to form a cutting edge parallel to the center line of the tool, the entire area performing the cutting operation. The apex of the two previously described angles creates a radius of 0.010 of an inch. Another cutting surface 130 creates a 120° included angle. The radius formed at 131 is 0.025 inches. The angles described above produce five cutting edges. An opening 132 is provided to receive a setscrew for securing said cutter to the bar 110 and in particular to the fluted portion 118 of bar diameter 114. (FIG. 2) The combination of replaceable cutters for contouring insert and three indexible positions for reaming and facing cutters provide adequate cutting capacity with great stability and the configuration of the tools provide for freedom from chatter.

This invention is particularly directed to the manufacture and finish of a hydraulic receptacle to accomodate an O ring and fitting having standard dimensions, specifically the MS33649.

It is essential that the receptacle have close tolerances in order that a tight fit will result and provide a secure seal.

I use cutting element 116 for reaming and a like cutting element 125 for facing described below and more particularly shown in FIGS. 9 and 10.

Figure 9:
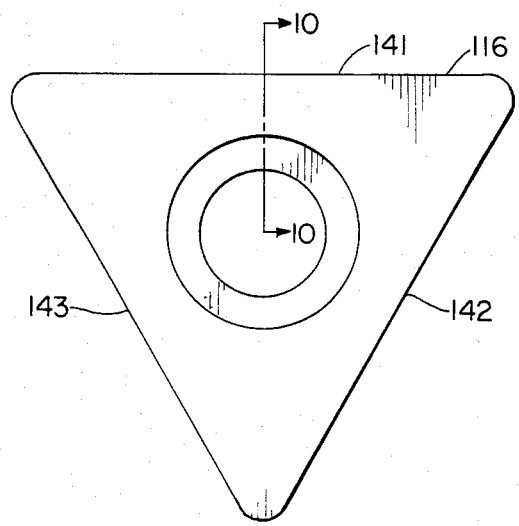
FIG. 9 is a plan view of the cutting element.
Figure 10:
FIG. 10 is a section view taken along the line 10—10 of FIG. 9.
Figure 11:
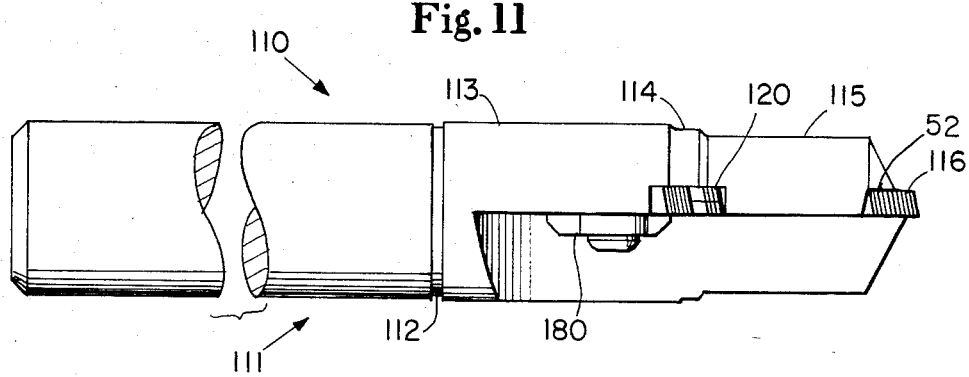
FIG. 11 is a side elevational view of a variation of the tool shown in FIG. 1.
Figure 12:
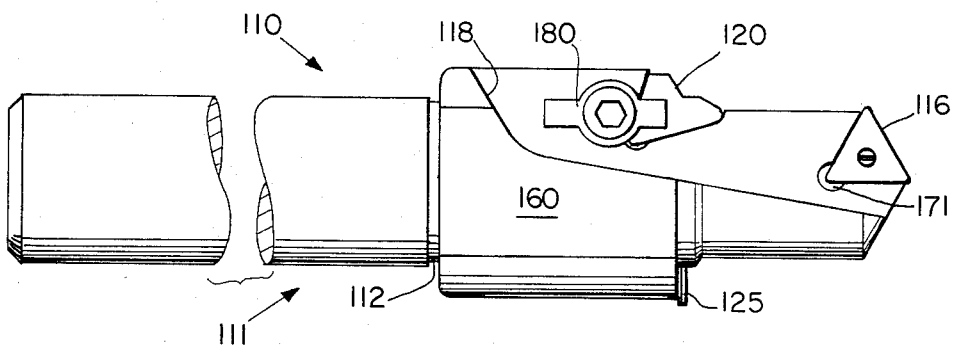
FIG. 12 is a top view of the tool shown in FIG. 11.
Figure 13:
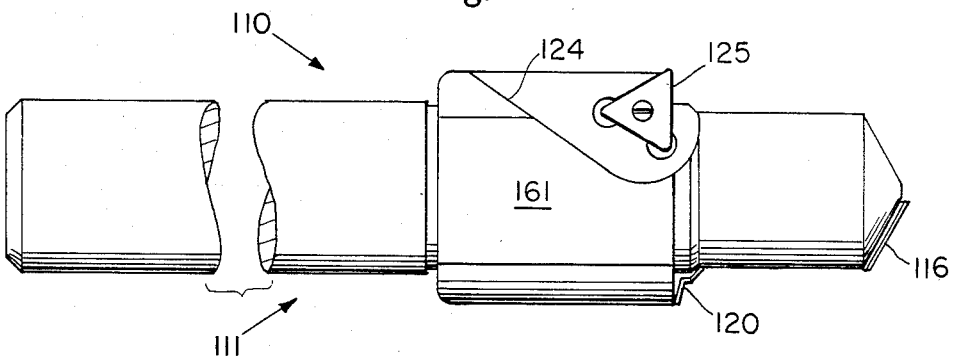
FIG. 13 is a side elevation of the tool taken at an angle 180° from that shown in FIG. 11.
Figure 14:
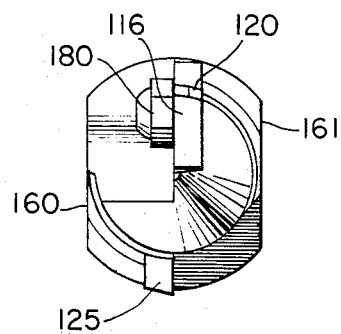
FIG. 14 is an end view of the tool shown in FIGS. 11, 12 and 13.

Referring to FIG. 9, I show a cutting element having identical cutting edges at the apex of three points. Each of these indexible cutting edges is adapted when selected to perform the function required to manufacture the fitting described in the foregoing paragraph.

Reference to FIG. 9 shows a cutting edge such as 141, which lies at an angle of 60° to a second cutting edge 142, and a third cutting edge 143 which lies at an angle of 60° to the second cutting edge.

Referring again to FIGS. 1, 2 and 3, the position of the cutters in the tool permits the chipped material to be expedited along the flute 118 and the flute 124.

The mounting of the cutting elements 116 and 125 is such that a single insert provides three separately usable cutting edges. The inserts are so designed that they assure chip size compatible with clearance by flushing actions. The screws such as 117, 121 and 126 are flush with the bottom surfaces of the flutes 118 and 124 and permit the ready release of chip material.

Other port cutting tools presently used and prior to my invention are made of high speed steel or carbide tipped cutting elements instead of the formed carbide which I employ in my invention.

Further, as previously described, the inserts 116, 120 and 125 are firmly secured against walls 145, 146, 147, 148, 149, 150, 151, and 152 as shown in FIGS. 1, 2, and 3.

Refer now to FIGS. 2 and 3, I provide flat surfaces 160 and 161 on opposite sides of the bar 110. As a result of the flattening I obtain proper coolant flow to the cut, resulting in a finer finish, longer tool life and increased speeds.

The inserts 116, 120, and 125 are secured to the bar 110 at the lower portion within the flutes 118 and 124 and rest upon three walls to insure stability and accuracy in positioning. Refer to flute 124 in FIG. 3 and reference made to side walls 149, 150, and 151. Great stability is required to spot face chatter free and, therefore, these seating walls are provided such as 149, 150, and 151. The boring tool 116 operates similarly to cutter 125.

Referring also to the cutting element 120, I provide three seating walls 147, 148, and 152. These walls are formed at an angle to the axis of the bar 110. The pocket reliefs such as 170, 171, 172, and 173 are located to prevent damage to cutting edges prior to indexing.

The chip material produced by the cutting edges described for the three cutting elements are compatible to being removed thru the flutes 118 and 124.

Figure 15:
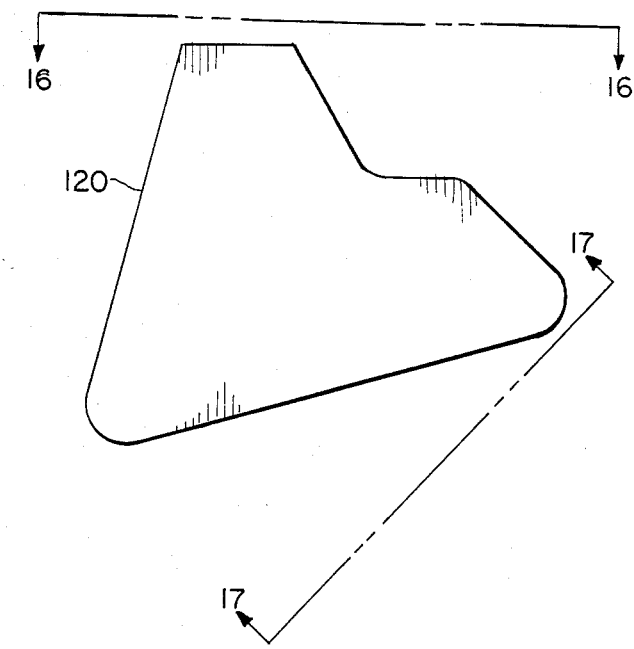
FIG. 15 is a plan view of one of the cutters.
Figure 16:
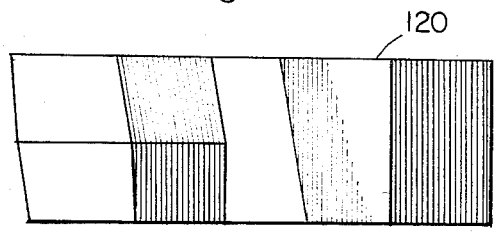
FIG. 16 is a side view taken along the line 16—16 of FIG. 15.
Figure 17:
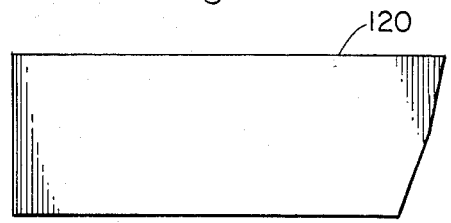
FIG. 17 is a side view taken along the line 17—17 of FIG. 15.

To eliminate chatter I have provided the tool with a clearance 52 between the cutting insert 116 and body diameter 115 of no more than 0.008 inches. In FIGS. 11, 12, 13, and 14, the same numerals refer to the same or similar parts previously described except a cutter clamp 180 is provided in place of a setscrew. In FIGS. 15, 16 and 17 the cutting element 120 is similar but without a hole for a mounting screw and is secured by a clamp 180.

It is readily apparent, therefore to persons skilled in the art that the tool described in this application with its particularly constructed cutting edges will result in the manufacture of a proper part for receiving a hydraulic fitting.

Although my invention is described with reference to a preferred embodiment, it will be apparent to those who are skilled in the art that additions, modifications and substitutions not specifically described and illustrated in the preferred embodiment may be made which will fall within the purview of the following claims:

I claim:

1. A cutting tool comprising in combination, a bar having three cylindrical surfaces, the first cylindrical surface adapted to fit a chuck of a machine tool, a second cylindrical surface lying below said first cylindrical surface, a third cylindrical surface lying below said second cylindrical surface, said two last named surfaces having flat surfaces formed on opposite sides thereof, flutes formed on said last named surfaces, a triangular cutting element indexibly secured to said third cylindrical surface at its lower end and lying within said flute formed on the second and third cylindrical surfaces, a second cutting element releasably secured to said second cylindrical surface, said second cutting element having five cutting edges, and a third cutting element indexibly secured to said second cylindrical surface and lying within a flute formed on said surface opposite of the previously described flute.

2. The cutting tool described in claim 1 wherein two of the cutting elements are indexible to one of three selected positions.

3. The cutting tool described in claim 1 having a pair of flutes, one of said flutes extending substantially the combined length of the second and third cylindrical bodies and projecting inwardly from the circumferences of said bodies, said flute permitting chips to be removed therefrom.

4. A cutting tool as described in claim 1 wherein one of the cutting elements is provided for contouring and has five cutting edges, one of the cutting edges lying parallel to the center line of the bar, one of said five cutting edges formed at an angle of 45° from the center line of the tool, and another one of the cutting serves creates a 120° included angle, an apex of two of the aforementioned angles creates a 0.010 inch radius and an apex of two other angles creates a 0.025 inch radius.

5. A cutting tool as described in claim 1 wherein two of the triangular cutting elements are indexible to three positions for cutting metal and provided with 11° clearance angle.

6. A cutting tool described in claim 1 wherein each of two of the triangular cutting elements is provided with three cutting surfaces, the first of said cutting surfaces lying at an angle of 60° to a second cutting surface, a third cutting surface lying at an angle of 30° to the second cutting surface.

7. A cutting tool described in claim 1 having a total of eleven cutting edges.

* * * * *